United States Patent
Miura et al.

(10) Patent No.: US 10,732,464 B2
(45) Date of Patent: Aug. 4, 2020

(54) LIGHT CONTROL FILM, LAMINATED GLASS AND METHOD FOR PRODUCING LIGHT CONTROL FILM

(71) Applicant: DAI NIPPON PRINTING CO., LTD., Tokyo (JP)

(72) Inventors: Keisuke Miura, Tokyo (JP); Yusuke Hagiwara, Tokyo (JP); Tsubasa Honda, Tokyo (JP); Noriko Katashima, Tokyo (JP); Norio Ishii, Tokyo (JP); Tomoya Kawashima, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/094,330

(22) PCT Filed: Apr. 20, 2017

(86) PCT No.: PCT/JP2017/015895
§ 371 (c)(1),
(2) Date: Oct. 17, 2018

(87) PCT Pub. No.: WO2017/183692
PCT Pub. Date: Oct. 26, 2017

(65) Prior Publication Data
US 2019/0121186 A1 Apr. 25, 2019

(30) Foreign Application Priority Data

Apr. 21, 2016 (JP) .................................. 2016-085392
Apr. 25, 2016 (JP) .................................. 2016-087131

(51) Int. Cl.
*G02F 1/1339* (2006.01)
*G02F 1/1337* (2006.01)
(Continued)

(52) U.S. Cl.
CPC ............ *G02F 1/13394* (2013.01); *E06B 3/66* (2013.01); *E06B 9/24* (2013.01); *G02F 1/13392* (2013.01);
(Continued)

(58) Field of Classification Search
CPC ... G02F 2001/133302; G02F 1/133305; G02F 2001/133368; G02F 1/13394;
(Continued)

(56) References Cited

U.S. PATENT DOCUMENTS 6,204,907 B1 * 3/2001 Hiraishi .............. G02F 1/13392
349/138
7,411,211 B1 * 8/2008 Yamazaki ........... G02F 1/13454
257/59

(Continued)

FOREIGN PATENT DOCUMENTS

| JP | S62-286023 A | 12/1987 |
|----|--------------|---------|
| JP | H02-120719 A | 5/1990 |

(Continued)

OTHER PUBLICATIONS

Schadt et al., "Surface-Induced Parallel Alignment of Liquid Crystals by Linearly Polymerized Photopolymers," Jpn. J. Appl. Physc., Jul. 1992, vol. 31, Part 1, No. 7, pp. 2155-2164.

(Continued)

*Primary Examiner* — Michael H Caley
*Assistant Examiner* — Mariam Qureshi
(74) *Attorney, Agent, or Firm* — Oliff PLC

(57) ABSTRACT

The present invention further improves the reliability of a spacer in comparison to conventional ones. A light control film 10 which is obtained by sandwiching a liquid crystal layer 14 between first and second laminates 13, 12 that are provided with at least alignment layers 23A, 23B, and which controls light transmitted therethrough by controlling the (Continued)

alignment of liquid crystal molecules 14A in the liquid crystal layer 14 by driving electrodes 22B, 22A that are provided on the first and second laminates 13, 12. With respect to the first laminate 13, a base 21B that is formed of a transparent film material is provided with a spacer 24 that maintains the thickness of the liquid crystal layer 14. With respect to the first and second laminates 13, 12, the Vickers hardness Xs of the spacer 24 is from 16.9 to 40.2 (inclusive), and the Vickers hardness Xf of a part of the second laminate 12, said part being in contact with the front end of the spacer 24, is from 11.8 to 35.9 (inclusive).

3 Claims, 6 Drawing Sheets

(51) Int. Cl.
  *E06B 3/66* (2006.01)
  *E06B 9/24* (2006.01)
  *G02F 1/1343* (2006.01)
(52) U.S. Cl.
  CPC ...... *G02F 1/1337* (2013.01); *G02F 1/134363* (2013.01); *G02F 2001/13398* (2013.01)
(58) Field of Classification Search
  CPC ........... G02F 1/133377; G02F 1/13392; G02F 2001/13398; G02F 1/1339; G02F 1/1337
  See application file for complete search history.

(56) References Cited

U.S. PATENT DOCUMENTS

2009/0091677 A1    4/2009  Cho et al.
2011/0310464 A1*  12/2011  Nomura ............... G02B 26/026
                                                          359/296

FOREIGN PATENT DOCUMENTS

| JP | H03-047392 A  | 2/1991  |
| JP | H08-184273 A  | 7/1996  |
| JP | 2001-083525 A | 3/2001  |
| JP | 2001-100188 A | 4/2001  |
| JP | 2001-174619 A | 6/2001  |
| JP | 2001-180264 A | 7/2001  |
| JP | 2004-069749 A | 3/2004  |
| JP | 2012-203184 A | 10/2012 |

OTHER PUBLICATIONS

Schadt et al., "Optical patterning of multi-domain liquid-crystal displays with wide viewing angles," Letters to Nature, Nature, May 16, 1996, vol. 381, pp. 212-215.
Jul. 4, 2017 International Search Report issued in International Patent Application No. PCT/JP2017/015895.
Aug. 30, 2019 Extended Search Report issued in European Patent Application No. 17786029.3.

* cited by examiner

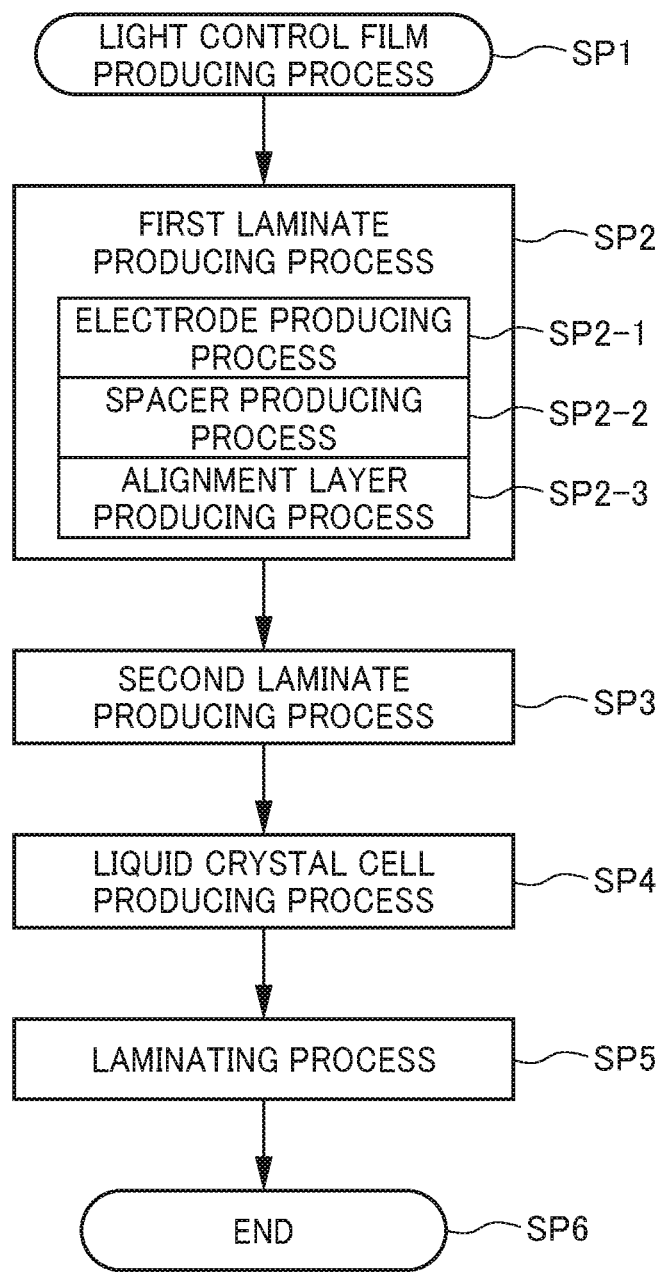

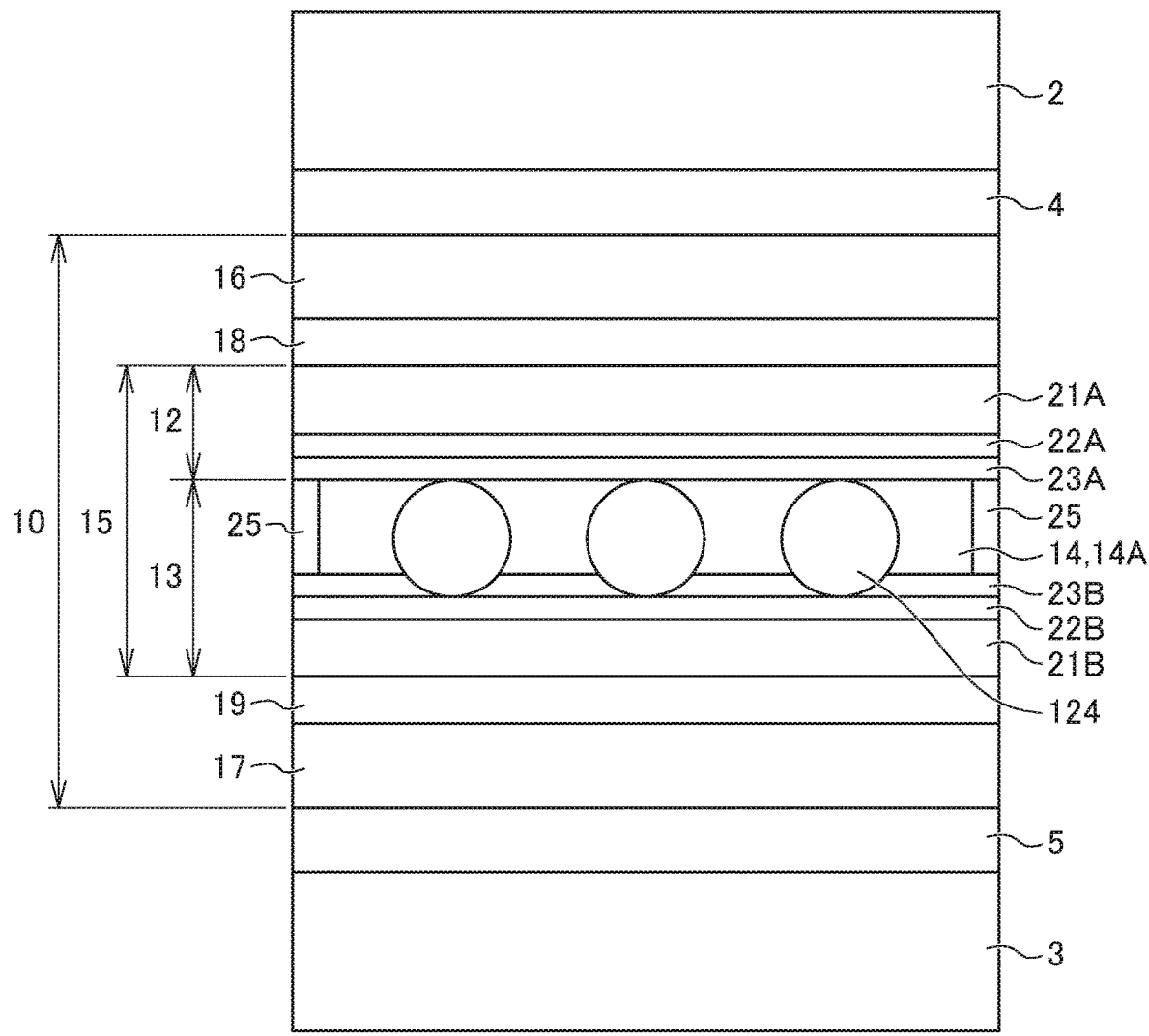

LIGHT CONTROL FILM, LAMINATED GLASS AND METHOD FOR PRODUCING LIGHT CONTROL FILM

TECHNICAL FIELD

The present invention relates to a light control film bonded to, for example, a window and usable in an electronic window blind or the like to control transmission of external light, and a laminated glass using this light control film.

BACKGROUND ART

In the related art, various techniques have been proposed for a light control film bonded to, for example, a window and usable in an electronic window blind to control transmission of external light (see Patent Documents 1 and 2). One type of such light control films uses liquid crystals. This type of light control film using liquid crystals is produced by sandwiching a liquid crystal cell between linear polarization films. The liquid crystal cell is produced by sandwiching a liquid crystal material between transparent panels provided with transparent electrodes. As a result, the light control film controls alignment of liquid crystals to shield or transmit external light, and even to change an amount of transmitted light by changing an electric field applied to the liquid crystals and, so that the light control film controls transmission of external light.

In such a light control film, a spacer is provided on a transparent substrate of the liquid crystal cell, so that a thickness of a liquid crystal layer is uniformly maintained by this spacer. In addition, the spacer has a configuration widely used in image display panels. For example, the spacer is produced in a rod shape, for example, using a photoresist.

In addition, a bead spacer may be employed, for example. Patent Documents 3 and 4 propose techniques on the bead spacer.

However, in some of the light control films of the related art, the spacer may collapse or a front end of the spacer may intrude into a facing surface due to a pressing force or the like during use. As a result, in the light control films of the related art, a cell gap has become irregular, or a local alignment failure has occurred. Accordingly, there have been some cases in which it is difficult to uniformly control light and other cases in which a liquid crystal material of the liquid crystal layer leaks. As a result, the light control films of the related art have encompassed drawbacks related to practical usage of the spacer from the viewpoint of reliability.

It may be conceived that such drawbacks may be addressed by a solution to increase the thickness of the spacer or the number of spacers. However, the solution described above may result in a decrease in transmittance or a deterioration in alignment of liquid crystals. In addition, it may be disadvantageous that diffraction light caused by the spacer may be visually recognizable.

Patent Document 1: Japanese Unexamined Patent Application, Publication No. H03-47392
Patent Document 2: Japanese Unexamined Patent Application, Publication No. H08-184273
Patent Document 3: Japanese Unexamined Patent Application, Publication No. S62-286023
Patent Document 4: Japanese Unexamined Patent Application, Publication No. H02-120719

DISCLOSURE OF THE INVENTION

Problems to be Solved by the Invention

In view of such circumstances, an object of the present invention is to make it possible to further improve reliability of the spacer, compared to the related art.

Means for Solving the Problems

The inventors have made diligent studies in order to address the aforementioned problems and finally have completed the invention by achieving an idea that the reliability of the spacer is improved by selecting a Vickers hardness $Xs$ of the spacer and a Vickers hardness $Xf$ of a surface where a front end of the spacer abuts.

In addition, the inventors have made diligent studies in order to address the aforementioned problems, and finally have completed the invention by achieving an idea that reliability of the spacer is improved by selecting a product $A \times B$, where A is representative of an occupation ratio as a ratio of an area occupied by the bead spacer as seen in plan view and B is representative of a Vickers hardness of a surface where a bead spacer abuts.

More specifically, the present invention provides the following technologies.

(1) A light control film including: a first laminate having at least an alignment layer; a second laminate having at least an alignment layer; a liquid crystal layer sandwiched between the first and second laminates; and electrodes, which are provided in the first and second laminates, configured to control alignment of liquid crystal molecules of the liquid crystal layer to control transmitted light when the electrodes are driven. The first laminate has a spacer provided in a base formed of a transparent film material to maintain a thickness of the liquid crystal layer. A Vickers hardness $Xs$ of the spacer is set to 16.9 to 40.2 inclusive, and a Vickers hardness $Xf$ of a portion of the second laminate where a front end of the spacer abuts is set to 11.8 to 35.9 inclusive.

According to technology (1), since the Vickers hardness $Xs$ of the spacer is set to 16.9 to 40.2 inclusive, and the Vickers hardness $Xf$ of the portion of the second laminate where the front end of the spacer abuts is set to 11.8 to 35.9 inclusive, it is possible to reduce intrusion of the front end of the spacer into the facing surface due to a pressing force during use or the like, reduce irregularity of cell gaps or occurrence of a local alignment failure, and effectively avoid leakage of a liquid crystal material. In addition, it is possible to reduce damage to the base and occurrence of a crack that may be generated when the entire laminate is bent. As a result, it is possible to further improve the reliability of the spacer, compared to the related art.

(2) A light control film including: a first laminate having at least an alignment layer; a second laminates having at least an alignment layer; a liquid crystal layer sandwiched between the first and second laminates; and electrodes, which are provided in the first and second laminates, configured to control alignment of liquid crystal molecules of the liquid crystal layer to control transmitted light when the electrodes are driven. The first laminate has a bead spacer provided in a base formed of a transparent film material to maintain a thickness of the liquid crystal layer. A Vickers hardness B of a portion of the second laminate where the bead spacer abuts is set to 11.8 to 35.9 inclusive. A product $A \times B$ is set to 0.42 or greater, where A is an occupation ratio as a ratio of an area of the bead spacer on the first laminate when the first laminate is seen in plan view.

According to technology (2), the Vickers hardness B is set to 11.8 to 35.9 inclusive, it is possible to reduce intrusion of the spacer into the facing surface due to a pressing force during use or the like, reduce irregularity of cell gaps or occurrence of a local alignment failure, and effectively avoid leakage of a liquid crystal material. In addition, it is possible to reduce damage to the base and occurrence of a crack that may be generated when the entire laminate is bent. Furthermore, since the product A×B of the occupation ratio A and the Vickers hardness B is set to 0.42 or greater, it is possible to increase the Vickers hardness B so as to maintain the cell gap through using the hardness B depending on a stress concentration to the bead spacer in a case where the occupation ratio A is small. Therefore, it is possible to further improve the reliability of the bead spacer, compared to the related art.

(3) A laminated glass is provided which includes the light control film according to technology (1) or (2) sandwiched between plate glasses.

According to technology (3), it is possible to configure the laminated glass using the light control film capable of further improving the reliability of the spacer, compared to the related art.

(4) A method of producing a light control film, the method including: a first laminate producing process for producing a first laminate having at least an alignment layer; a second laminate producing process for producing a second laminate having at least an alignment layer; and a liquid crystal cell producing process for producing a liquid crystal cell formed by laminating the first laminate, a liquid crystal layer, and the second laminate. The first laminate producing process has a spacer producing process for producing a spacer configured to maintain a thickness of the liquid crystal layer in a base. In the spacer producing process, the spacer is produced such that a Vickers hardness Xs of the spacer becomes 16.9 to 40.2 inclusive. In the second laminate producing process, the second laminate is produced such that a Vickers hardness Xf of a portion of the second laminate where a front end of the spacer abuts becomes 11.8 to 35.9 inclusive.

According to technology (4), since the Vickers hardness Xs of the spacer is set to 16.9 to 40.2 inclusive, and the Vickers hardness Xf of the second laminate where the front end of the spacer abuts is set to 11.8 to 35.9 inclusive, it is possible to reduce intrusion of the front end of the spacer into the facing surface due to a pressing force during use or the like, reduce irregularity of cell gaps or occurrence of a local alignment failure, and effectively avoid leakage of a liquid crystal material. In addition, it is possible to reduce damage to the base and occurrence of a crack that may be generated when the entire laminate is bent. As a result, it is possible to further improve the reliability of the spacer, compared to the related art.

(5) A method of producing a light control film, the method including: a first laminate producing process for producing a first laminate having at least an alignment layer; a second laminate producing process for producing a second laminate having at least an alignment layer; and a liquid crystal cell producing process for producing a liquid crystal cell formed by laminating the first laminate, a liquid crystal layer, and the second laminate. The first laminate producing process has a bead spacer arrangement process for arranging a bead spacer configured to maintain a thickness of the liquid crystal layer in a base. In the second laminate producing process, the second laminate is produced such that a Vickers hardness B of a portion of the second laminate where the bead spacer abuts becomes 11.8 to 35.9 inclusive. In the bead spacer arrangement process, the bead spacer is arranged such that a product A×B is set to 0.42 or greater, where A is an occupation ratio as a ratio of an area of the bead spacer on the first laminate when the first laminate is seen in plan view.

According to technology (5), since the Vickers hardness B is set to 11.8 to 35.9 inclusive, it is possible to reduce intrusion of the bead spacer into the facing surface due to a pressing force during use or the like, reduce irregularity of cell gaps or occurrence of a local alignment failure, and effectively avoid leakage of a liquid crystal material. In addition, since the product A×B of the occupation ratio A and the Vickers hardness B is set to 0.42 or greater, it is possible to increase the Vickers hardness B so as to maintain the cell gap through using the hardness B depending on a stress concentration to the bead spacer in a case where the occupation ratio A is small. As a result, it is possible to further reduce the intrusion of the bead spacer into the facing surface, reduce the irregularity of cell gaps or the occurrence of a local alignment failure, and effectively avoid the leakage of a liquid crystal material. Therefore, it is possible to further improve the reliability of the bead spacer, compared to the related art.

Effects of the Invention

According to the present invention, it is possible to further improve the reliability of the spacer in the light control film using liquid crystals, compared to the related art.

BRIEF DESCRIPTION OF THE DRAWINGS

FIG. 4 is a flowchart illustrating a producing process of the light control film of FIG. 2;

FIG. 5 is a diagram illustrating a laminated glass according to a second embodiment of the invention.

PREFERRED MODE FOR CARRYING OUT THE INVENTION

First Embodiment

[Laminated Glass]

Figure 1:
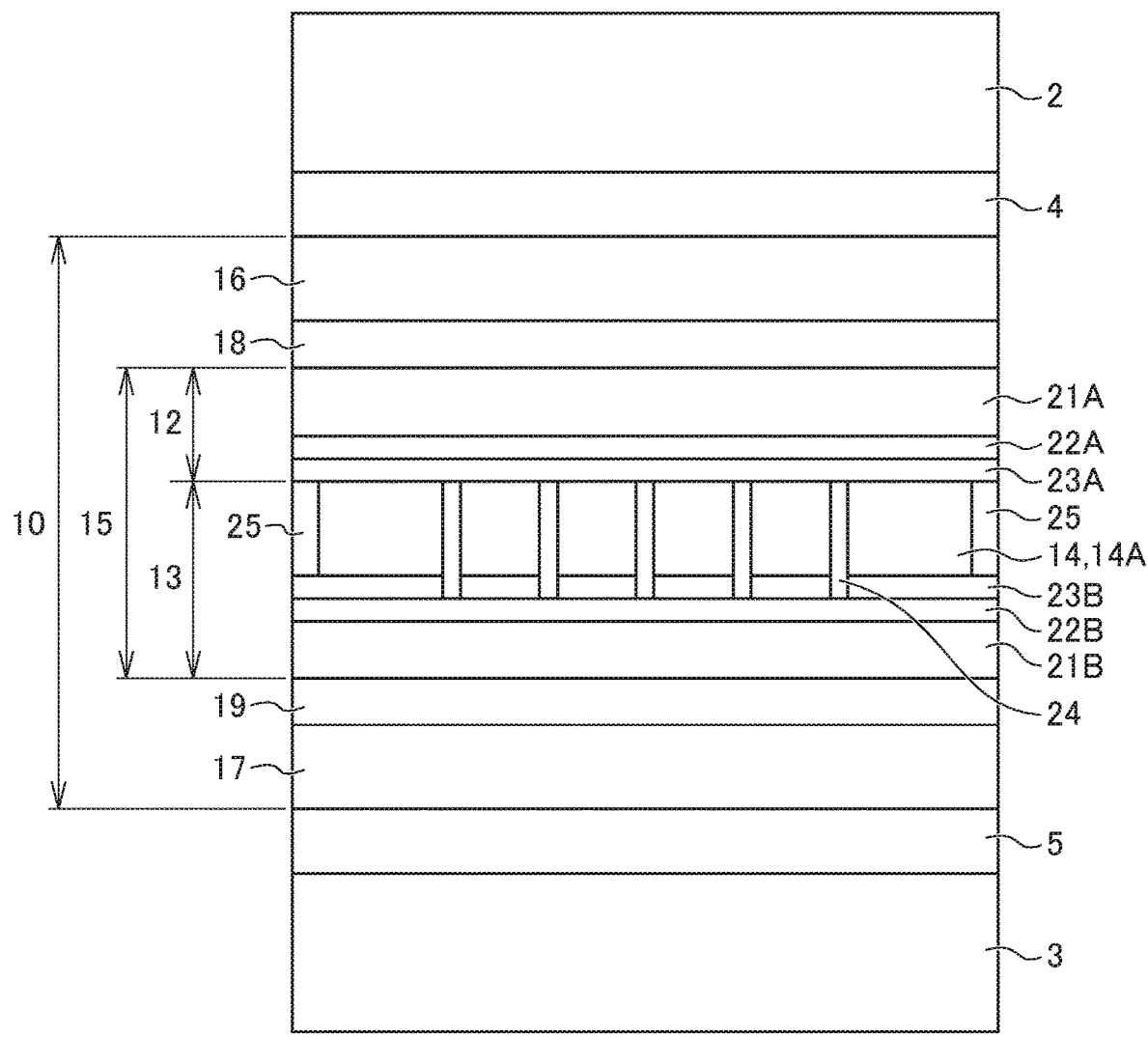
FIG. 1 is a diagram illustrating a laminated glass according to a first embodiment of the invention.

FIG. 1 is a cross-sectional view illustrating a laminated glass according to a first embodiment of the invention. A laminated glass 1 is a laminated glass applied to, for example, a vehicle window in which a light control film 10 is sandwiched between plate glasses 2 and 3 by inserting middle layers 4 and 5, respectively. Here, a variety of materials used for laminated glasses are applicable to the plate glasses 2 and 3. In addition, the middle layers 4 and 5 are each configured to function as a bonding layer between the light control film 10 and the plate glass 2 or 3. A variety of configurations used for laminated glasses are applicable to the middle layers 4 and 5, which may be configured for serving as heat ray shielding material.

The plate glasses 2 and 3 to which the middle layers 4 and 5 are attached respectively are laminated with the light control film 10. Subsequently, the plate glasses 2 and 3 and the light control film 10 are integrated with each other via the middle layers 4 and 5 into the laminated glass 1, the entirety of which is formed in a desired curved shape, by heating and pressing. As a result, the laminated glass 1 is produced applicable to, for example, a rear windshield of a vehicle or the like and to control transmitted light through the light control film 10. Note that the producing process of the laminated glass 1 includes a laminating process for laminating the plate glasses 2 and 3 to which the middle layers 4 and 5 are attached, respectively, with the light control film 10 and a heating/pressing process for heating and pressing the laminate obtained in the laminating process.

[Light Control Film]

Figure 2:
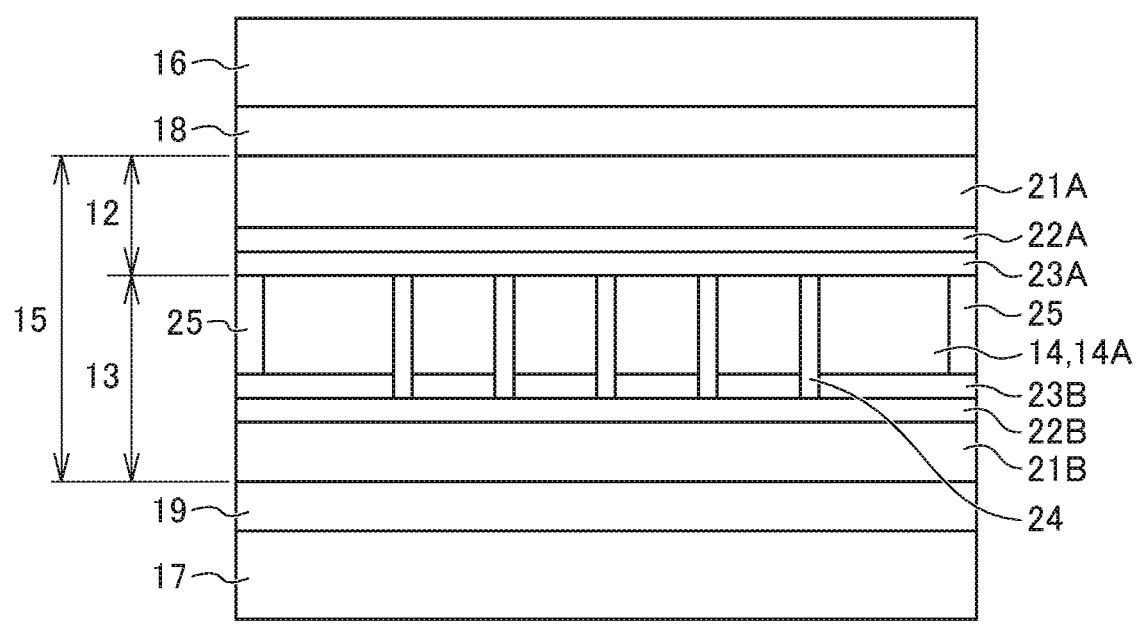
FIG. 2 is a diagram illustrating a light control film used in the laminated glass of FIG. 1.

FIG. 2 is a cross-sectional view illustrating the light control film. This light control film 10 is formed in a film shape for use in the laminated glass. In another usage, the light control film 10 is bonded to, for example, a portion requiring light control. In this connection, the usage of the light control film 10 which is bonded to the light control portion includes, for example, switching between transparent and opaque states when applied to a rear windshield of a vehicle, a glass window of a building, a showcase, an interior transparent partition, or the like.

This light control film 10 is a light control film for controlling transmitted light using liquid crystals. A liquid crystal cell 15 is produced by sandwiching a liquid crystal layer 14 between a lower laminate 13 as a first laminate and an upper laminate 12 as a second laminate each having a film shape. The light control film 10 is produced by sandwiching the liquid crystal cell 15 between linear polarization films 16 and 17. Here, according to this embodiment, a twisted nematic (TN) type is employed for driving the liquid crystal layer 14. Instead, various driving types such as a vertical alignment (VA) type or an in-plane switching (IPS) type may also be employed. The light control film 10 has a spacer 24 provided in the upper laminate 12 and/or the lower laminate 13 to uniformly maintain a thickness of the liquid crystal layer 14. The linear polarization films 16 and 17 have phase difference films 18 and 19, respectively, provided on sides facing the liquid crystal cell 15 for optical compensation. The laminates 12 and 13 are formed by sequentially providing electrodes 22A and 22B and alignment layers 23A and 23B on bases 21A and 21B, respectively. Alternatively, the phase difference films 18 and 19 may be omitted as necessary. Alternatively, the light control film 10 may be produced by a guest-host method. In this case, a linear polarization film may be arranged on either one side or both sides of a liquid crystal cell as necessary.

Figure 3A:
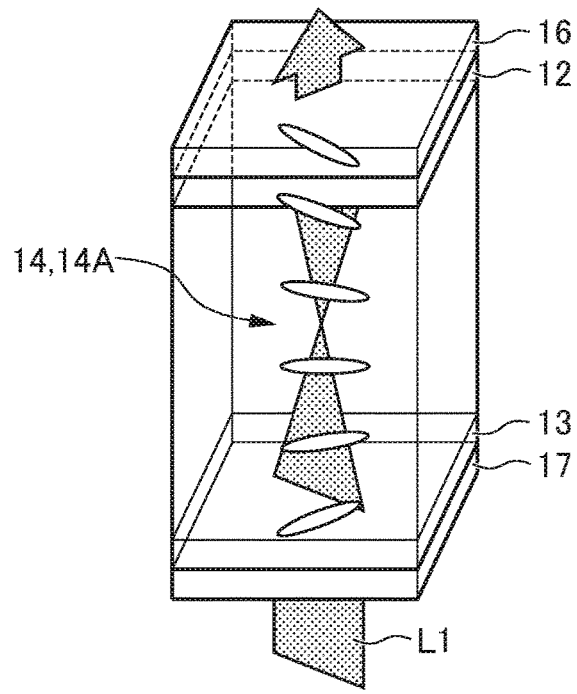
FIGS. 3A and 3B are diagrams describing the principle of operation for the light control film of FIG. 2.
Figure 3B:
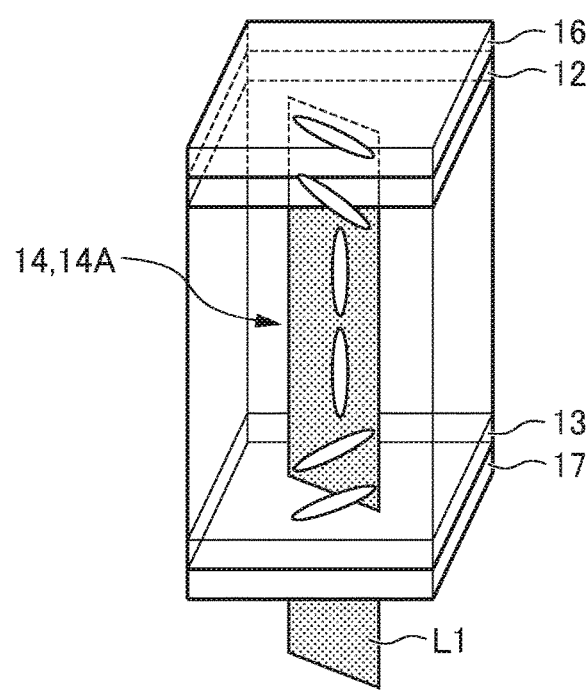
Figure 6:
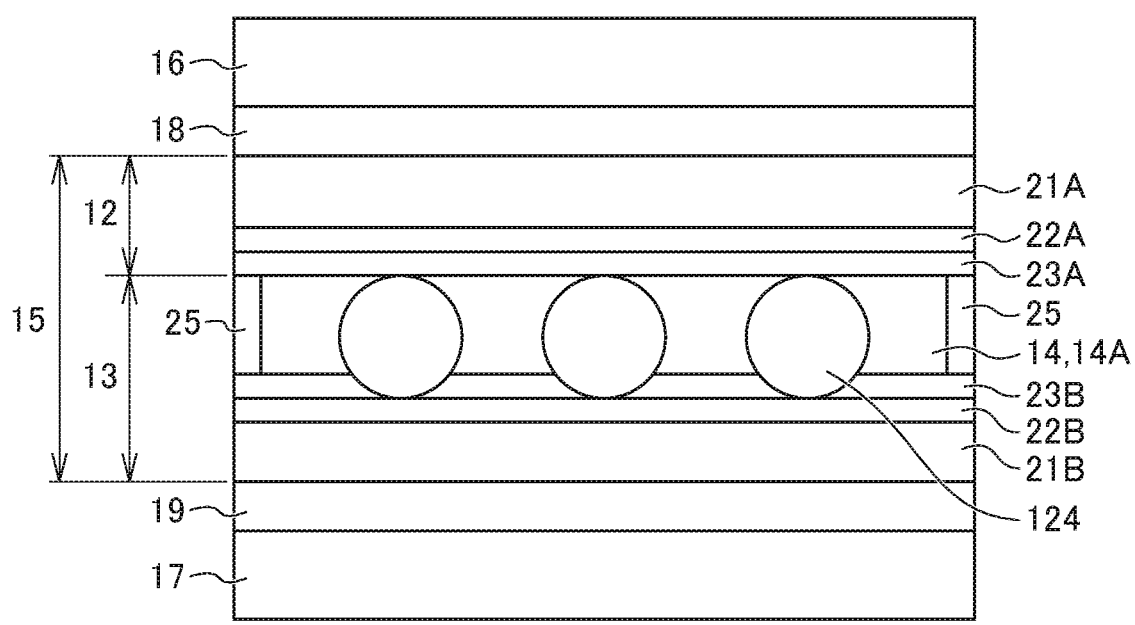
FIG. 6 is a diagram illustrating a light control film used in the laminated glass of FIG. 5.

As a result, the light control film 10 is configured to be switchable between a transparent state and an opaque state by controlling transmission of external light L1 as illustrated in FIGS. 3A and 3B according to a change in the voltage applied to the electrodes 22A and 22B. In addition, FIG. 3A illustrates a state in which no voltage is applied between the electrodes 22A and 22B, and FIG. 3B illustrates a state in which a voltage is applied to the electrodes 22A and 22B. As a result, according to this embodiment, the liquid crystal layer 14 is driven in a so-called normally white mode. Alternatively, the liquid crystal layer 14 may also be driven in a normally black mode. In addition, in a case where the IPS type is employed, the electrodes 22A and 22B are produced collectively with the alignment layer 23A or 23B, and the laminates 12 and 13 are configured to match the alignment layers.

Incidentally, in a usage where the light control film 10 is bonded, for example, to a glass window of a building, a showcase, an interior transparent partition, or the like, a protection layer having a hard coat layer or the like is provided on a surface of the linear polarization film 16 and/or 17 opposite to the liquid crystal cell 15.

Here, various transparent film materials having flexibility applicable to the liquid crystal cell 15 may be applied to the bases 21A and 21B. According to this embodiment, a film material formed of polycarbonate and provided with hard coat layers on both sides is employed. Various types may be employed for the electrodes 22A and 22B as long as they can apply a substantially uniform electric field to the liquid crystal layer 14 and are visually transparent. However, according to this embodiment, the electrodes 22A and 22B are formed by producing a transparent conductive film formed of indium tin oxide (ITO) as a transparent electrode material on the entire surfaces of the bases 21A and 21B. Note that, the electrodes are patterned in desired shapes as described above in the IPS type or the like.

The alignment layers 23A and 23B are formed from optical alignment layers. Here, a variety of materials to which an optical alignment technique is applicable may be applied to this optical alignment layers. However, according to this embodiment, for example, a photodimerization type material is employed. This photodimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212 (1996)", and the like.

Alternatively, the alignment layers 23A and 23B may be produced through a rubbing process instead of the optical alignment layer. In this case, the alignment layers 23A and 23B are formed by producing various material layers applicable to the alignment layer such as polyimide and then producing a fine linear uneven shape through a rubbing process using a rubbing roll on a surface of the material layer. Alternatively, the alignment layer may be produced by producing the fine linear uneven shape through a molding process instead of the alignment layer or the optical alignment layer formed through the rubbing process.

The spacer 24 is provided for defining a thickness of the liquid crystal layer 14, and may be formed of a variety of resin materials. According to this embodiment, the spacer 24 is produced of a photoresist. The spacer 24 is produced by coating, exposing, and developing a photoresist on the base 21B on which the transparent electrode 22B is produced. Note that the spacer 24 may be provided in the upper laminate 12 or may be provided in both the upper and lower laminates 12 and 13. Furthermore, the spacer 24 may be provided on the alignment layer 23B. Moreover, the spacer may be a so-called bead spacer.

A variety of liquid crystal materials applicable to such a type of light control films may be applied to the liquid crystal layer 14. More specifically, a liquid crystal compound described in Japanese Unexamined Patent Application, Publication No. 2003-366484 may be applied to the liquid crystal layer 14, for example. In addition, as a commercially available product, for example, a liquid crystal material, MLC2166 or the like, manufactured by Merck KGaA may be employed. Note that, in the case of the guest-host method, a liquid crystal material and a pigment for light control are mixed together into the liquid crystal layer 14. A variety of mixtures of liquid crystal material and pigment proposed in the guest-host method may be employed. The liquid crystal cell 15 has a seal material 25 arranged to surround the liquid crystal layer 14, so that the seal material 25 prevents leakage of the liquid crystal. Here, the seal material 25 may be formed of, for example, epoxy resin, ultraviolet curable resin, or the like.

[Producing Process]

FIG. 4 is a flowchart illustrating a producing process of the light control film 10. In a first laminate producing process SP2, the first laminate 13 of the liquid crystal cell 15 is produced.

In the first laminate producing process SP2, the transparent electrode 22B is produced with ITO on the base 21B through sputtering or the like in an electrode producing process SP2-1.

In a subsequent spacer producing process SP2-2, a coat liquid (photoresist) for the spacer 24 is coated, and the coated liquid is then subjected to drying, exposure, and development to produce the spacer 24.

Subsequently, in an alignment layer producing process SP2-3, a coat liquid for the alignment layer 23B which is coated and dried is subjected to curing by irradiating ultraviolet rays, so that the alignment layer 23B is produced. As a result, according to this embodiment, the first laminate 13 is produced.

In the process of producing the light control film 10, the second laminate 12 is produced in a subsequent second laminate producing process SP3 similarly with the first laminate producing process SP2. That is, in the second laminate producing process SP3, the transparent electrode 22A is produced with ITO on the base 21A through sputtering or the like, and a coat liquid for the alignment layer 23A is coated, dried, and cured to produce the alignment layer 23A. As a result, the second laminate 12 is produced.

In a subsequent liquid crystal cell producing process SP4, the seal material 25 is coated in a frame shape using a dispenser. Then, a liquid crystal material is disposed in a portion of the frame shape, and the upper and lower laminates 12 and 13 are laminated and pressed. Then, the seal material 25 is cured by irradiating ultraviolet rays or the like. As a result, the liquid crystal cell 15 is produced. Alternatively, in the arrangement of the liquid crystal material, the upper and lower laminates 12 and 13 may be laminated first, and the liquid crystal material may be disposed in a cavity formed by laminating the upper and lower laminates 12 and 13.

In a subsequent laminating process SP5, the light control film 10 is formed by laminating the linear polarization films 16 and 17. Note that the bases 21A and 21B are provided in long films which are wound in rolls. The liquid crystal cell 15 undergoes all of the processes SP2 to SP5 or a part of the processes SP2 to SP5 while the bases 21A and 21B are extracted from the rolls and fed. Note that, as a result, each process for the liquid crystal cell 15 is executed piece by piece in the middle of the process as necessary.

[Specific Configuration of Spacer]

Here, according to this embodiment, the spacer 24 is formed in a cylindrical rod shape or a truncated conical shape using the photoresist through the process of FIG. 4. As a result, the spacer 24 is produced. According to this embodiment, a Vickers hardness Xs of the spacer 24 is set to 16.9 to 40.2 inclusive, and a Vickers hardness Xf of a portion of the second laminate 12 where a front end of the spacer 24 abuts is set to 11.8 to 35.9 inclusive. As a result, the reliability of the spacer is further increased, compared to the related art. Note that the values of the Vickers hardness are measurement values under the condition described in the following Examples.

That is, in a case where the Vickers hardness Xf of the portion of the second laminate 12 where the front end of the spacer 24 abuts is lower than 11.8, the front end of the spacer 24 intrudes into a facing surface due to a pressing force generated during use. As a result, the cell gap may become irregular, or a local alignment failure may occur. In addition, in this case, the base 21A may be damaged due to a contact or like during assembly of the spacer 24, or a crack may be generated when the entire laminate is bent.

In addition, in a case where the Vickers hardness Xs of the spacer 24 is lower than 16.9, the spacer 24 is collapsed by an external pressure, and the cell gap is reduced, so that it is difficult to obtain a desired cell gap. In addition, in a case where the Vickers hardness Xs of the spacer 24 is higher than 40.2, or in a case where the Vickers hardness Xf of the portion of the second laminate 12 where the front end of the spacer 24 abuts is higher than 35.9, the cell gap may be reduced, or damage or a crack may be generated in some cases.

However, in a case where the Vickers hardness Xs of the spacer 24 is set to 16.9 to 40.2 inclusive, and the Vickers hardness Xf of the portion of the second laminate 12 where the front end of the spacer 24 abuts is set to 11.8 to 35.9 inclusive, it is possible to simultaneously address such problems and further improve the reliability of the spacer, compared to the related art.

[Test Results]

Tables 1 and 2 are tables showing test results to verify the spacer. In Tables 1 and 2, the tests of Examples and Comparative Examples were performed under the same condition except for the configurations of the spacer and the alignment layer where the spacer abuts. More specifically, in the light control films of Examples and Comparative Examples, the spacer 24 was provided only in the lower laminate 13, and the Vickers hardness Xs of the spacer 24 was changed by differently setting the producing condition of the spacer 24. In addition, the Vickers hardness Xf of the portion of the second laminate 12 where the front end of the spacer 24 abuts was changed by differently setting the producing condition of the alignment layer 23A.

That is, a coat liquid for the spacer 24 is coated and then dried. Then, a portion to be provided with the spacer 24 is selectively exposed by performing mask exposure using an exposure apparatus. Note that the above described is a positive type photoresist case. In contrast, in the case of a negative type photoresist, a portion except for the portion to be provided with the spacer 24 is selectively exposed. Then, an unexposed portion or an exposed portion of the spacer 24 is selectively removed through a developing process. Then, a rinse process or the like is executed, and a drying process or the like is executed as necessary.

This exposure process may be performed in a so-called half cure state in which pre-heating is performed or under a heated environment in some cases. In addition, in the developing process, a heating process may be performed to promote reaction after the rinse process or the like in some cases. The hardness Xs of the spacer 24 is adjustable by: selecting material of the photoresist for the spacer 24; setting heating temperatures, heating times exposure amounts, exposure times and mask caps for the coating process, the exposure process and the developing process.

According to this embodiment, lower laminates 13 having Vickers hardnesses Xs of spacers 24 each set to 14.8, 16.9, 22.2, 40.2, and 51.4 were produced by setting the heating temperatures and the heating times in the exposure process and the developing process (Table 3). Note that each hardness is a measurement value measured for a lower laminate 13 which was produced by setting a producing condition of a spacer 24 and which was once assembled into a light control film 10 and separated therefrom. In addition, the measurement was performed by measuring twelve points in each light control film and obtaining an average of measurement values of ten points by excluding the maximum and minimum values.

Incidentally, the spacer 24 was produced in a cylindrical rod shape having a diameter of 9 μm and a height of 6 μm. In addition, the spacers 24 were arranged with a pitch of 110 μm along two directions perpendicular to each other in a plane of the base 21B. Therefore, a ratio of an area occupied by a spacer 24 on the base 21B (occupation ratio) was set to $0.5\% (=((9/2)^2 \times 3)/(110)^2)$.

As the occupation ratio increases, a stress applied to each spacer is reduced. Therefore, it is possible to reduce a collapse of the spacer 24 or intrusion of the front end. However, transmittance or a light blinding ratio may decrease accordingly. To the contrary, in a case where the occupation ratio is small, it may be possible to ensure an optical property such as transmittance and a light blinding ratio. However, it may be difficult to avoid a phenomenon such as a collapse of the spacer 24 or intrusion of the front end. As a result, the occupation ratio is desirably set to 0.5% to 10% inclusive.

In comparison, alignment layers 23A of upper laminates 12 which are surfaces where the spacers abut were produced by coating a coat liquid, and drying and thermally curing the coated liquid. The Vickers hardnesses Xf were controlled by setting thermal curing conditions (heating temperatures and heating times) or the like. As a result, the upper laminates 12 having the Vickers hardnesses Xf of 10.2, 11.8, 24.8, 35.9, and 38.5 were produced (Table 4) in Examples and Comparative Examples. Note that the hardness Xf is a measurement value measured for a upper laminate 12 which was once assembled into a light control film 10 and then separated therefrom. The upper laminates 12 were produced in advance such that the upper laminates 12 differed from each other in hardnesses of the alignment layers 23A, which are the surfaces where the spacers abut, by setting producing conditions of the alignment layers 23A. In addition, this measurement was performed by measuring twelve points and obtaining an average of ten points by excluding the maximum and minimum values.

Incidentally, the Vickers hardnesses Xs and Xf were measured using PICODENTOR HM500, manufactured by Helmut Fischer GmbH. The measurement was performed by setting an insertion rate to 300 mN/20 sec, a release rate to 300 mN/20 sec, a creep time to 5 sec, and a maximum load to 100 mN.

In Examples and Comparative Examples of Tables 1 and 2, light control films were produced and tested using the upper and lower laminates 12 and 13 produced in this manner. In the test of Tables 1 and 2, a load of 0.8 MPa was applied while the light control films were placed on a smooth surface, a hardness of which is high, of a surface plate. Then, the cell gap was measured to determine reduction of the cell gap. Note that the loading time was set to 24 hours. In addition, after the load was applied in this manner, the upper and lower laminates were separated from each other, and the spacer was observed using a microscope to observe a collapse of the spacer and reduction of the cell gap. In addition, the portion where the spacer abuts was observed using a microscope to observe intrusion of the front end of the spacer.

Here, the microscopic observation was performed using a scanning electron microscope (SEM) or the like in front view, perspective view, and cross-sectional view to visually verify deformation of the spacer. In a case where deformation of the spacer was verified, it was determined whether the deformation is "reduction of cell gap or collapse of spacer" depending on its situation, and O/X marks were added to the tables. Accordingly, in Tables 1 and 2, the mark "O" indicates a normal case where no anomalousness was observed for the corresponding item, and the mark "X" indicates an abnormal case where anomalousness was observed for the corresponding item.

In addition, similarly, the portion where the spacer abuts was observed using a SEM or the like in perspective view. In this case, when a hollow (recess) was verified, the item "film intrusion" was determined as "X". When the recess was not verified, the item "film intrusion" was determined as "O".

In addition, an occurrence of damage was visually verified by displacing relative positions of the laminates 12 and 13 at a rate of 0.1 cm/sec while a load of 0.1 MPa was applied to the laminates 12 and 13. Here, in a case where the occurrence of damage was verified from a half or more of a plurality of samples, the item "damage (film)" is marked as "X". In contrast, in a case where the occurrence of damage was not verified from a half or more of the plurality of samples, the item "damage" is marked as "O".

In addition, an occurrence of a crack was verified by winding the light control film around a cylindrical mandrel having a diameter of 2 mm in accordance with a bending test regulation of the JIS K5600-5-1. In a case where the occurrence of a crack in the base was verified for a half or more of the plurality of samples, in this test, the item "crack (film)" is marked as "X". In contrast, in a case where the occurrence of a crack in the base was not verified for a half or more of the plurality of samples, the item "crack" is marked as "X".

TABLE 1

|  | Example 1 | Example 2 | Example 3 | Example 4 | Example 5 | Example 6 | Example 7 |
|---|---|---|---|---|---|---|---|
| Xs (μm) | 22.2 | 16.9 | 16.9 | 16.9 | 40.2 | 40.2 | 40.2 |
| Xf (μm) | 24.8 | 11.8 | 24.8 | 35.9 | 11.8 | 24.8 | 35.9 |
| Reduction of cell gap | o | o | o | o | o | o | o |
| Film intrusion | o | o | o | o | o | o | o |
| Damage | o | o | o | o | o | o | o |
| Crack | o | o | o | o | o | o | o |

|  | Comparative Example 1 | Comparative Example 2 | Comparative Example 3 | Comparative Example 4 |
|---|---|---|---|---|
| Xs (μm) | 16.9 | 16.9 | 40.2 | 40.2 |
| Xf (μm) | 10.2 | 38.5 | 10.2 | 38.5 |
| Reduction of cell gap | o | x | o | x |

TABLE 1-continued

| | | | | |
|---|---|---|---|---|
| Film intrusion | ○ | ○ | x | ○ |
| Damage | x | x | x | x |
| Crack | x | ○ | x | x |

TABLE 2

| | Example 8 | Example 9 | Example 10 | Example 11 | Example 12 | Example 13 |
|---|---|---|---|---|---|---|
| Xs (μm) | 16.9 | 22.2 | 40.2 | 16.9 | 22.2 | 40.2 |
| Xf (μm) | 11.8 | 11.8 | 11.8 | 35.9 | 35.9 | 35.9 |
| Reduction of cell gap | ○ | ○ | ○ | ○ | ○ | ○ |
| Film intrusion | ○ | ○ | ○ | ○ | ○ | ○ |
| Damage | ○ | ○ | ○ | ○ | ○ | ○ |
| Crack | ○ | ○ | ○ | ○ | ○ | ○ |

| | Comparative Example 5 | Comparative Example 6 | Comparative Example 7 | Comparative Example 8 |
|---|---|---|---|---|
| $X_s$ (μm) | 14.8 | 51.4 | 14.8 | 51.4 |
| $X_f$ (μm) | 11.8 | 11.8 | 35.9 | 35.9 |
| Reduction of cell gap | x | x | x | ○ |
| Film intrusion | x | x | ○ | ○ |
| Damage | x | ○ | ○ | x |
| Crack | x | ○ | ○ | ○ |

TABLE 3

Producing condition of spacer

| Xs | Photoresist material | Heating temperature in coating process (° C.) | Heating time in coating process (minutes) | Light exposure (mJ) | Exposure time (seconds) |
|---|---|---|---|---|---|
| 14.8 | Acrylic positive-type photoresist | 130 | 30 | 80 | 20 |
| 16.9 | | 130 | 60 | 90 | 23 |
| 22.2 | | 130 | 60 | 100 | 25 |
| 40.2 | | 140 | 60 | 150 | 38 |
| 51.4 | | 140 | 120 | 150 | 38 |

TABLE 4

Producing condition of alignment layer

| Xf | Heating temperature of thermal curing (° C.) | Heating time of thermal curing (minutes) |
|---|---|---|
| 10.2 | 110 | 30 |
| 11.8 | 120 | 10 |
| 24.8 | 120 | 30 |
| 35.9 | 130 | 30 |
| 38.5 | 130 | 60 |

In the measurement results of Tables 1 and 2, in a case where the Vickers hardness Xs of the spacer 24 was lower than 16.9 (Comparative Examples 5 and 7), reduction of the cell gap was verified. In addition, in Comparative Example 5, intrusion of the front end of the spacer into the film, damage, and cracks were verified. Furthermore, in a case where the Vickers hardness Xf of the portion of the second laminate 12 where the front end of the spacer 24 abuts was lower than 11.8 (Comparative Examples 1 and 3), damage and cracks were observed. Moreover, in Comparative Example 3, intrusion of the front end of the spacer to the film was observed.

In addition, in a case where the Vickers hardness Xs of the spacer 24 was higher than 40.2 (Comparative Examples 6 and 8), reduction of the cell gap and intrusion of the front end of the spacer into the film were observed in Comparative Example 6, and damage was observed in Comparative Example 8. In addition, in a case where the Vickers hardness Xf of the portion of the second laminate 12 where the front end of the spacer 24 abuts was higher than 35.9 (Comparative Examples 2 and 4), reduction of the cell gap and damage were observed. Furthermore, in Comparative Example 4, a crack was observed.

To the contrary, in Examples 1 to 13, such phenomena were not observed. As a result, it was demonstrated that the reliability of the spacer is sufficiently achievable.

Second Embodiment

[Laminated Glass]

FIG. 5 is a cross-sectional view illustrating a laminated glass according to a second embodiment of the invention. A laminated glass 101 is similar to the laminated glass 1 of the first embodiment except for a bead spacer 124. Accordingly, like reference numerals denote like elements, and they will not be described repeatedly.

The bead spacer 124 is provided to define a thickness of a liquid crystal layer 14. The bead spacer 124 can be formed using a variety of configurations such as a configuration using an inorganic material such as silica, a configuration using an organic material, and a core-shell structure using a combination of organic and inorganic materials. In addition, the bead spacer 124 may be formed in a rod shape such as a cylindrical rod shape and a polygonal rod shape as well as a spherical shape. The bead spacer 124 may be provided in an upper laminate 12 or may be provided in both upper and lower laminates 12 and 13. In addition, the bead spacer 124 may be provided on an alignment layer 23B. Furthermore, while the bead spacer 124 is formed of a transparent material, a coloring material may be applied as necessary to control colorization.

[Producing Process]

Since the process of producing a light control film 110 is similar to the process of FIG. 4 of the first embodiment, the process will not be described repeatedly. The second embodiment is different from the first embodiment in that the spacer producing process SP2-2 of the first embodiment is replaced with a spacer arrangement process SP2-2 in the second embodiment in which bead spacers 124 are arranged.

Here, a variety of arrangement methods in addition to wet/dry spraying may be applied to the bead spacers 124. According to this embodiment, a coat liquid obtained by dispersing the bead spacers 124 in a solvent along with a resin component is partially coated, and drying and sintering processes are sequentially executed, so that the bead spacers 124 are randomly arranged on an electrode 22B and are maintained in an immovable state. As a result, the bead spacers 124 are arranged.

[Specific Configuration of Bead Spacer]

Here, according to this embodiment, a light control film is produced by arranging the bead spacer 124 in the spacer arrangement process SP2-2, so that the Vickers hardness B of a portion of the upper laminate 12 where the bead spacer 124 abuts is set to 11.8 to 35.9 inclusive, and a product A×B is set to 0.42 or greater, where A is an occupation ratio of the bead spacer 124. Note that, here, the occupation ratio A is a ratio of an area occupied by the bead spacers 124 to an area of the lower laminate 13 when the lower laminate 13 is seen in plan view (as seen from a vertical direction). As a result, according to this embodiment, it is possible to further improve the reliability of the bead spacer, compared to the related art. Note that the Vickers hardness is a measurement value under the condition described in the following Examples and Comparative Examples.

In a case where the Vickers hardness B of the portion of the second laminate 12 where a front end of the bead spacer 124 abuts is lower than 11.8, the front end of the bead spacer 124 intrudes into a facing surface due to a pressing force during use. As a result, a cell gap becomes irregular, or a local alignment failure occurs. In addition, in a case where the Vickers hardness B of this portion is higher than 35.9, a crack is generated when the entire laminate is bent.

In addition, in a case where the product A×B is lower than 0.42, the front end of the bead spacer 124 intrudes into the facing surface. As a result, the cell gap becomes irregular, or a local alignment failure occurs.

However, it is possible to simultaneously address such problems and further improve the reliability of the bead spacer compared to the related art by setting the Vickers hardness B of the portion of the upper laminate 12 where the bead spacer 124 abuts to 11.8 to 35.9 inclusive and setting the product A×B to 0.42 or greater.

Specifically, in a case where the Vickers hardness B of the portion of the upper laminate 12 where the bead spacer 124 abuts is set to 11.8 to 35.9 inclusive, it is possible to prevent the front end of the bead spacer 124 from intruding into the facing surface due to a pressing force during use and prevent an occurrence of a crack. In addition, in a case where the product A×B of the occupation ratio A and the Vickers hardness B is set to 0.42 or greater, it is possible to further reduce the intrusion of the bead spacer or a crack that may be generated by bending the laminate.

That is, in a case where the Vickers hardness B is low, it can be said that the corresponding portion is soft. As a result, the intrusion of the bead spacer may easily occur. In contrast, in a case where the Vickers hardness B is high, the corresponding portion is stiff. Accordingly, a crack may easily occur when the corresponding portion is bent. As a result, by setting the hardness B to 11.8 to 35.9 inclusive, it is possible to reduce the intrusion of the bead spacer or the occurrence of a crack that may be generated by bending the laminate.

However, even when the hardness B is set in this manner, a magnitude of the stress applied to one spacer changes depending on the number of spacers. In a case where the occupation ratio A, which is an index of the magnitude, is low, a stress concentration on one spacer increases. As a result, in a case where the product A×B is smaller than 0.42 even when the hardness B is set to 11.8 to 35.9 inclusive, the bead spacer may easily intrude. In addition, in a case where the occupation ratio A is low, a stress concentration relating to bending increases due to the small number of spacers. As a result, in a case where the product A×B is smaller than 0.42 even when the hardness B is set to 11.8 to 35.9 inclusive, a crack may easily occur. For these reasons, it is possible to further improve the reliability of the bead spacer, compared to the related art, by not only setting the Vickers hardness B to 11.8 to 35.9 inclusive but also setting the product A×B to 0.42 or greater.

[Test Results]

Tables 5 and 6 are tables showing test results to verify bead spacers. Examples and Comparative Examples of Tables 5 and 6 were performed under the same condition except for configurations of bead spacers and alignment layers where the bead spacers abut. More specifically, in the light control films of these Examples and Comparative Examples, bead spacers 124 were provided only in lower laminates 13, and occupation ratios A were changed depending on sizes of the bead spacers 124 and application amounts of the bead spacers 124. In addition, the Vickers hardness B of the portion of a second laminate 12 where the front end of a bead spacer 124 abuts was set depending on the producing condition of an alignment layer 23A.

That is, a coat liquid obtained by dispersing the bead spacers 124 in a solvent along with a resin component is coated, and a drying process and a curing process by irradiating ultraviolet rays and sintering process are sequentially executed, so that the bead spacers 124 are randomly arranged on an electrode 22B and are maintained in an immovable state. The occupation ratio of the bead spacer 124 was controlled by adjusting an adding amount of bead spacers 124 to the coat liquid and a coating thickness of the coat liquid.

In Examples and Comparative Examples, a density of the bead spacers 124 was set to 40 pieces/mm$^2$, 50 pieces/mm$^2$, or 100 pieces/mm$^2$, and a bead spacer 124 had a spherical shape having a diameter of 3 μm or 6 μm. As a result, the lower laminate 13 was produced by setting the occupation ratio A to 0.028%, 0.035%, 0.071%, 0.113%, or 0.141%. Note that the bead spacer 124 was produced using the Micropearl EX series, manufactured by SEKISUI CHEMICAL CO., LTD.

A base 21B is a cycloolefin polymer (COP) film having a hard coat layer with a thickness of 100 μm. The electrode 22B was produced with a thickness of 20 nm.

An alignment layer 23B was produced by coating a coat liquid such that a coating thickness in a dried state was 100 nm and further performing thermal curing.

In comparison, similar to the alignment layer 23B, the Vickers hardness B of an alignment layer 23A of the upper laminate 12 which was a surface where the bead spacer 124 abuts was controlled by setting a thermal curing condition (heating temperature and heating time) for the coated liquid which had undergone coating and drying. As a result, in Examples and Comparative Examples, upper laminates 12 having the Vickers hardnesses B of 10.2, 11.8, 35.9, and 38.5 were produced (Table 7). Note that each hardness B is a measurement value measured for each of the upper laminates 12 having different hardnesses relative to the alignment layers 23A, each upper laminate 12 having been produced by setting a producing condition of the alignment layer 23A and having been once assembled into the light control film 110 and separated therefrom. In addition, this measurement was performed by measuring twelve points and obtaining an average of the measurement values of ten points by excluding the maximum and minimum values.

Incidentally, the Vickers hardness B was measured using PICODENTOR HM500, manufactured by Helmut Fischer GmbH. The measurement was performed by setting an insertion rate to 300 mN/20 sec, a release rate to 300 mN/20 sec, a creep time to 5 sec, and a maximum load to 100 mN.

Incidentally, a base 21A and an electrode 22A of the upper laminate 12 were configured similarly to the base 21B and the electrode 22B of the lower laminate 13. Note that the alignment layer 23A was configured similarly to the alignment layer 23B except that the hardness B was adjusted.

In Examples and Comparative Examples of Tables 5 and 6, light control films were produced and tested using upper and lower laminates 12 and 13 produced in this manner. In the test of Tables 5 and 6, a load of 1 kg/cm² was applied for one minute while a light control film was placed on a smooth surface, a hardness of which is high, of a surface plate. Then, a liquid crystal cell was driven to determine reduction of a cell gap. In addition, after the load was applied in this manner, the upper and lower laminates were separated from each other, and the portion where the bead spacer abuts was observed using a microscope to observe intrusion of the front end of the bead spacer.

Here, in a case where a hollow (recess) was verified by observing the portion where the bead spacer 124 abuts using a SEM or the like in perspective view, the item "film intrusion" was marked as "X". In a case where no recess was verified, the item "film intrusion" was marked as "O".

In addition, an occurrence of a crack was verified by winding a light control film around a cylindrical mandrel having a diameter of 2 mm in accordance with a bending test regulation of JIS K5600-5-1. In a case where the occurrence of a crack in the base was verified for a half or more of a plurality of samples, in this test, the item "crack" was marked as "X". In contrast, in a case where the occurrence of a crack in the base was not verified for a half or more of the plurality of samples, the item "crack" was marked as "O".

TABLE 5

|  | Example 1 | Example 2 | Example 3 | Example 4 | Example 5 | Example 6 |
|---|---|---|---|---|---|---|
| Bead diameter (μm) | 3 | 3 | 3 | 6 | 6 | 6 |
| Density (Pieces/mm²) | 50 | 50 | 100 | 50 | 50 | 40 |
| Occupation ratio A (%) | 0.035 | 0.035 | 0.071 | 0.141 | 0.141 | 0.113 |
| Vickers hardness B | 11.8 | 35.9 | 11.8 | 11.8 | 35.9 | 11.8 |
| A × B | 0.42 | 1.27 | 0.83 | 1.67 | 5.08 | 1.33 |
| Film intrusion | o | o | o | o | o | o |
| Crack | o | o | o | o | o | o |

TABLE 6

|  | Comparative Example 1 | Comparative Example 2 | Comparative Example 3 | Comparative Example 4 |
|---|---|---|---|---|
| Bead diameter (μm) | 3 | 3 | 3 | 3 |
| Density (Pieces/mm²) | 50 | 50 | 100 | 40 |
| Occupation ratio A (%) | 0.035 | 0.035 | 0.071 | 0.028 |
| Vickers hardness B | 10.2 | 38.5 | 10.2 | 10.2 |
| A × B | 0.36 | 1.36 | 0.72 | 0.29 |
| Film intrusion | x | o | x | x |
| Crack | o | x | o | o |

TABLE 6-continued

|  | Comparative Example 5 | Comparative Example 6 | Comparative Example 7 | Comparative Example 8 |
|---|---|---|---|---|
| Bead diameter (μm) | 3 | 6 | 6 | 6 |
| Density (Pieces/mm²) | 40 | 50 | 50 | 40 |
| Occupation ratio A (%) | 0.028 | 0.141 | 0.141 | 0.113 |
| Vickers hardness B | 11.8 | 10.2 | 38.5 | 10.2 |
| A × B | 0.33 | 1.44 | 5.44 | 1.15 |
| Film intrusion | x | x | o | x |
| Crack | o | o | x | o |

TABLE 7

| | Producing condition of alignment layer | |
|---|---|---|
| B | Heating temperature of thermal curing (° C.) | Heating time of thermal curing (minutes) |
| 10.2 | 110 | 30 |
| 11.8 | 120 | 10 |
| 35.9 | 130 | 30 |
| 38.5 | 130 | 60 |

In the measurement results of Tables 5 and 6, it was verified that the film intrusion was prevented, and no crack was generated in a case where the Vickers hardness B of the portion of the second laminate 12 where the bead spacer 124 abuts was set to 11.8 to 35.9 inclusive, and the product A×B was set to 0.42 or greater, where A representative of the occupation ratio and B representative of the Vickers hardness. As a result, it was demonstrated that the reliability of the bead spacer was sufficiently achievable.

Other Embodiments

While preferable embodiments of the present invention have been described in detail hereinbefore, various modifications or alterations of the above embodiments may be possible without departing from the spirit and scope of the invention.

EXPLANATION OF REFERENCE NUMERALS 1, 101 LAMINATED GLASS
2, 3 PLATE GLASS
4, 5 MIDDLE LAYER
10, 110 LIGHT CONTROL FILM
12 UPPER LAMINATE

13 LOWER LAMINATE
14 LIQUID CRYSTAL LAYER
14A LIQUID CRYSTAL MOLECULES
15 LIQUID CRYSTAL CELL
16, 17 LINEAR POLARIZATION FILM
18, 19 PHASE DIFFERENCE FILM
21A, 21B BASE
22A, 22B ELECTRODE
23A, 23B ALIGNMENT LAYER
24 SPACER
25 SEAL MATERIAL
124 BEAD SPACER

The invention claimed is:

1. A light control film comprising:
a first laminate having at least an alignment layer;
a second laminate having at least an alignment layer;
a liquid crystal layer sandwiched between the first and second laminates; and
electrodes, which are provided in the first and second laminates, configured to control alignment of liquid crystal molecules of the liquid crystal layer to control transmitted light when the electrodes are driven,
wherein the first laminate has a bead spacer provided in a base formed of a transparent film material to maintain a thickness of the liquid crystal layer, and
the bead spacer abuts on the second laminate, and
wherein a Vickers hardness B of the alignment layer of the second laminate is set to 11.8 to 35.9 inclusive, and
a product A×B is set to 0.42 or greater, where A is an occupation ratio representative of a ratio of an area of the bead spacer on the first laminate when the first laminate is seen in plan view.

2. A laminated glass comprising the light control film according to claim 1 sandwiched between plate glasses.

3. A method of producing a light control film, the method comprising:
a first laminate producing process for producing a first laminate having at least an alignment layer;
a second laminate producing process for producing a second laminate having at least an alignment layer; and
a liquid crystal cell producing process for producing a liquid crystal cell formed by laminating the first laminate, a liquid crystal layer, and the second laminate,
wherein the first laminate producing process has a bead spacer arrangement process for arranging a bead spacer configured to maintain a thickness of the liquid crystal layer in a base,
wherein in the second laminate producing process, the bead spacer is arranged so as to abut on the second laminate, and
the second laminate is produced such that a Vickers hardness B of the alignment layer of the second laminate becomes 11.8 to 35.9 inclusive, and
wherein in the bead spacer arrangement process, the bead spacer is arranged such that a product A×B is set to 0.42 or greater, where A is an occupation ratio representative of a ratio of an area of the bead spacer on the first laminate when the first laminate is seen in plan view.

* * * * *